July 6, 1965  C. F. STIMETZ  3,192,636
COMBINATION SINE MARKER AND DIVIDING HEAD
Filed May 15, 1963  3 Sheets-Sheet 1
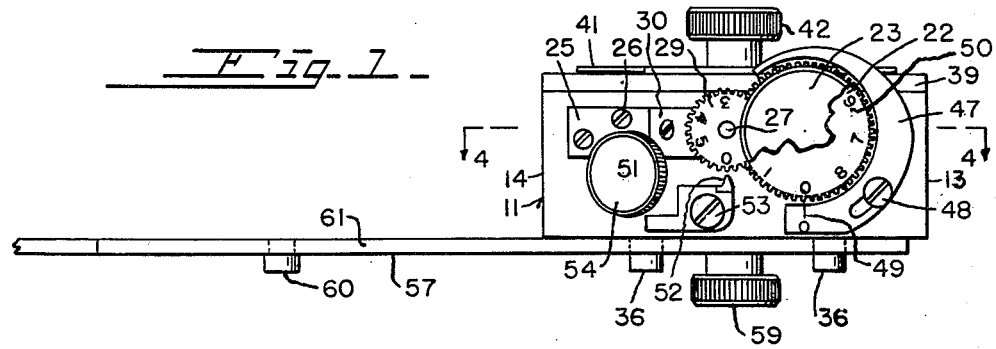
Fig. 1
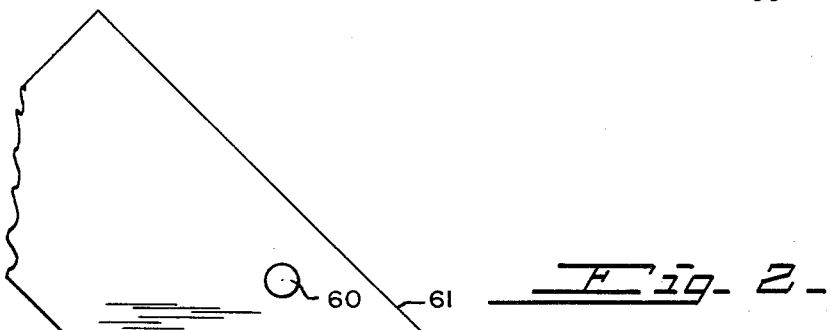
Fig. 2
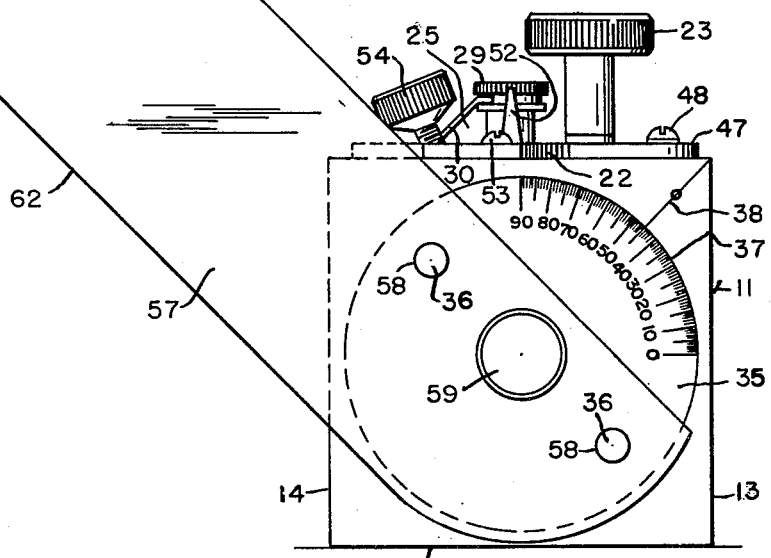
INVENTOR.
CARL F. STIMETZ.
BY
*H.C. Karel.*
ATTORNEY.

July 6, 1965 C. F. STIMETZ 3,192,636
COMBINATION SINE MARKER AND DIVIDING HEAD
Filed May 15, 1963 3 Sheets-Sheet 2

INVENTOR.
CARL F. STIMETZ.
BY
ATTORNEY.

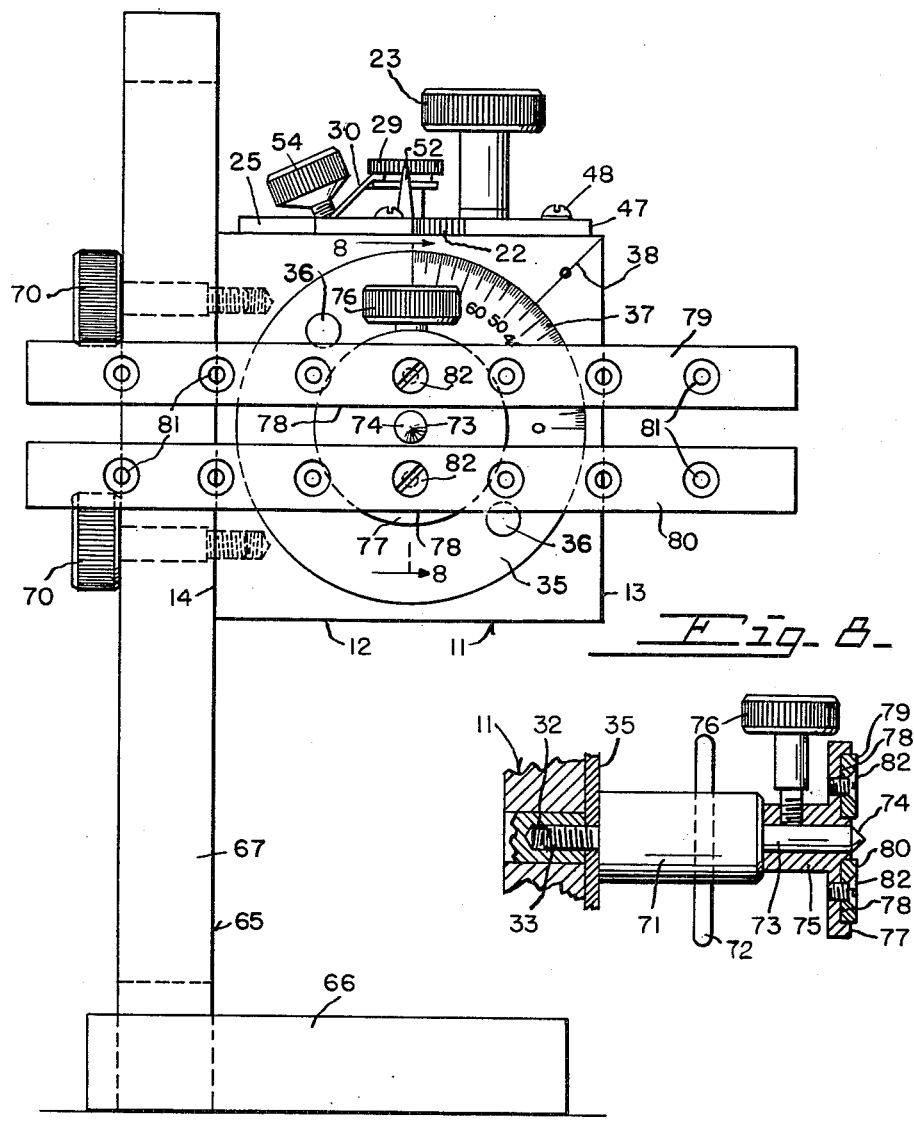

3,192,636
COMBINATION SINE MARKER AND DIVIDING HEAD
Carl F. Stimetz, 2516 Hansford Place, Cincinnati 14, Ohio
Filed May 15, 1963, Ser. No. 280,594
6 Claims. (Cl. 33—174)

This invention relates to an improved combination sine marker and dividing head for use by a tool maker in laying out work. The device permits extreme accurate angle determination or angular division of the work piece. The sine marker is a device used to facilitate precision angle-measurements. Heretofore the sine bar was used in connection with cylinders and gage blocks to obtain the correct angle. In my improved sine marker, the straight edge sine bar is attached to a rotating member whereby the angle can be accurately set. This sine bar makes application of the known relation between sides of a right triangle and its angles.

To use the device as a dividing head, the sine marker is removed from the device and an attachment is secured to the rotating member whereby the work piece which is clamped to the attachment can be rotated to locate the proper accurate angle or angles.

The object of my invention is to provide a device for accurately setting the angle of a sine marker.

A further object is to combine an attachment with the device for forming a dividing head.

A further object is to provide means for indicating the angle in degrees and minutes.

My invention will be further readily understood from the following description and claims and from the drawings, in which latter:

FIG. 1 is a plan view of the device with the sine marker attached.

FIG. 2 is a front view of the same.

FIG. 7 is a front view of the device shown in FIG. 6.

FIG. 8 is a detail section, taken in the plane of the line 8—8 of FIG. 7.

Figure 3:
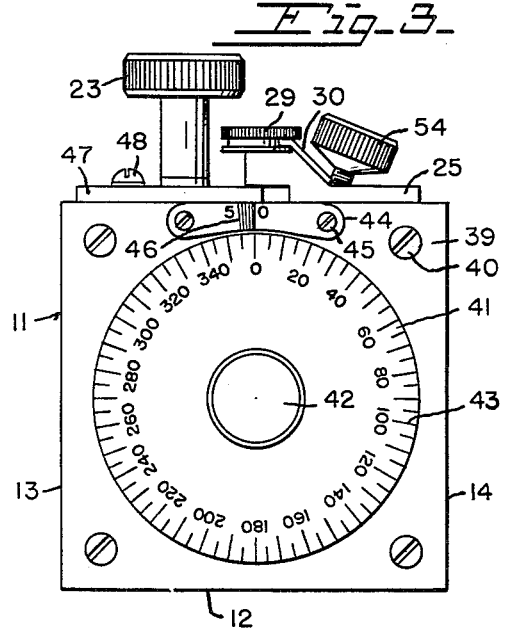
FIG. 3 is a rear view of the device.
Figure 4:
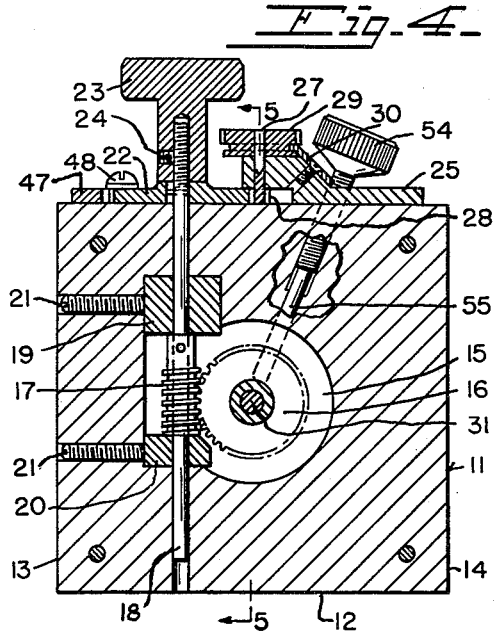
FIG. 4 is a vertical section, taken in the plane of the line 4—4 of FIG. 1.

My improved device comprises a block 11 having an accurate finished base face 12 and accurate right angle end faces 13 and 14. The block 11 has a recess 15 for a worm wheel 16 and worm 17. The worm 17 is mounted on a shaft 18 journalled in blocks 19 and 20 which are held in position by screws 21. The shaft 18 extends upward through the block and has a gear 22 keyed thereto. A knob 23 is threaded to the upper end of the shaft 18 and locked thereto by a screw 24. A supporting block 25 is attached to the upper face of the block 11 by screws 26 and supports a shaft 27 having a gear 28 on the lower end of the shaft 27 meshing with the gear 22. A gear 29 is pressed onto the upper end of the shaft 27. A guide member 30 journals the shaft 27 and maintains the gear and shaft 27 in position. The worm wheel 16 is pinned to a shaft 31 journalled in the block 11 and the enlarged end 32 of the shaft 31 has a threaded hole 33 therein. The other end of the shaft is threaded as at 34. Pressed onto the shaft end 32 is a disk 35 set into the block and has a pair of extending pins 36 thereon and angle indicia 37 from 0° to 90° registering with a zero mark 38 on the block. A cover 39 encloses the worm and worm wheel recess and is attached to the block by means of screws 40. A disk 41 is clamped to the hub of the worm wheel 16 by a nut 42 received over the threaded end 34 of the shaft 31. This disk 41 is graduated in degrees as indicated at 43. A plate 44 is secured to the cover 39 above the disk 41 by screws 45 and has degree markings 46 for the registration of the degree markings 43 on the disk 41 with the degree markings 46.

A guard 47 encircles part of the gear 22 and is adjustably secured to the top of the block 11 by a screw 48 and has a zero marking 49 thereon. The face of the gear 22 is divided into nine equal parts and is marked with numerals 0 to 8, as at 50. The gear 29 is divided into six equal parts and is marked 0 to 5 as at 51. An indicator 52 is secured to the top of the block 11 by a screw 53 arranged to register with the markings 51 on the gear 29. An angularly disposed thumb screw 54 is threaded into the block 11 and bears against a brake element 55.

When the device is used as a sine marker, which will hereinafter be more fully described, a plate 57 having apertures 58 to fit over the pins 36 is attached to the disk 35 by a thumb screw 59 threaded into the threaded hole 33. This plate has a pin 60 five inches from the center of the thumb screw 59. The pin 60 is on a center line with the apertures 58. The plate 57 has parallel faces 61 and 62.

To use the device as a dividing head, the thumb screw 59 and the plate 57 are removed. A standard 65 having a base 66 with an upright 67 is secured to the base with a screw 68. The upright has an elongated slot 69 therein to permit the block 11 to be attached to the upright at the desired height by thumb screws 70 clamping the block to the upright. A center pin 71 is threaded into the threaded hole 33 by means of the extended pin 72 and has a reduced extension 73 terminating in a center 74. A sleeve 75 is received over the extension 73 and clamped thereto by a thumb screw 76. The sleeve 75 has a disk 77 with parallel slots 78 for reception of bars 78 and 80. The bars are provided with countersunk holes 81 whereby the bars can be adjustably secured to the disk 77 by screws 82.

To use the device as a sine marker, the plate 57 is attached to the disk 35 and the angle can be accurately set by turning the knob 23 to the degree and minute. The degree is read on the scale 37, the minutes on the scale 50 on the gear 22 on which each tooth represents five minutes and the exact minute is read on the scale on the gear 29. In the present instance the drawings show the sine bar set at 45°. To check the angle, the sine of 45° being .707 is multiplied by 5, which is the distance from the center of the pin 60 to the center of the thumb screw 59 plus the distance from the base to the center of the thumb screw 59 which is one and one-half inches plus one-half the diameter of the pin 60 which is .125, all of which equals 5.160 inches. The block 11 is set on a surface plate and using a height gage, the distance to the top of the pin 60 should read 5.160 inches, if the angle is correctly set. The thumb screw 54 is tightened to lock the shaft 31. The work piece is then set on the face 61 of the sine marker and clamped to an angle plate to machine the proper angle on the work piece. For angles greater than 60°, the block is set on the face 13 and the cosine of the angle is used in checking the angle. For angles over 60° the work piece is placed on the face 62 and clamped to the angle plate.

The gear ratio is 40 to 1 between the worm and the worm wheel, with six teeth on the gear 28 and fifty-four teeth on the gear 22.

Figure 6:
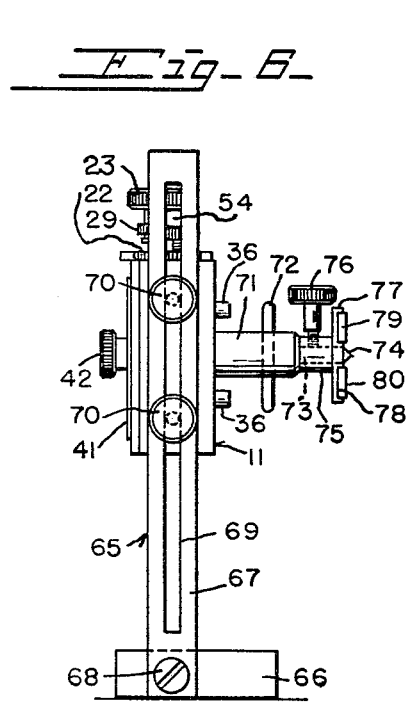
FIG. 6 is a reduced end view of the device with the dividing head attached thereto.
Figure 5:
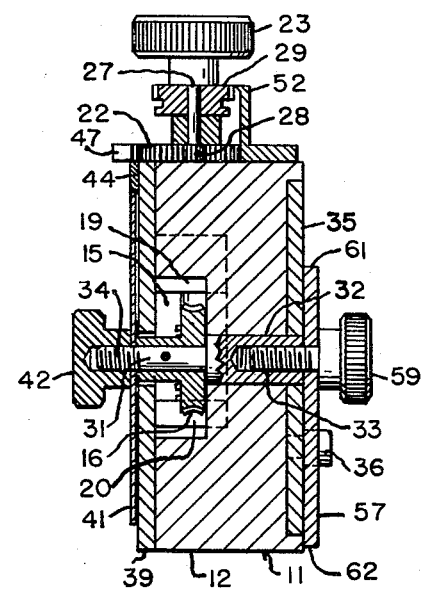
FIG. 5 is a vertical section, taken in the plane of the line 5—5 of FIG. 4.

To use the device as a dividing head, the block 11 is clamped to the standard 65 and the parts assembled as shown in FIGS. 6, 7 and 8. The block 11 can be raised or lowered on the standard to suit the particular work to be divided into angles. The bars 79 and 80 can be adjusted to permit clamping the work to the bars and by using the degree scale 43 and turning the knob 23 the proper angles can be determined and marked on the work piece.

Having thus fully described my invention, what I claim as new and desire to secure by Letters Patent, is:

1. A combination sine marker and dividing head comprising;
    (a) a block arranged to set on a surface plate in one position for sines and another position for cosines,
    (b) a transverse shaft in said block,
    (c) a worm on said shaft,
    (d) disks on the respective sides of said block having degree indications thereon rotatable with said shaft,
    (e) a vertical shaft extending through said block,
    (f) a worm on said vertical shaft meshing with said worm wheel,
    (g) a minute indicator on said vertical shaft,
    (h) a second indicator geared to said first named indicator for recording the exact minute,
    (i) a knob secured to said vertical shaft for rotating said shaft and disks, and
    (j) a sine bar attachable to one of said disks by a pair of pins and a central screw and provided with a height gauge pin.

2. A combination sine marker and dividing head comprising;
    (a) a block arranged to set on a surface plate in one position for sines and another position for cosines,
    (b) a transverse shaft in said block,
    (c) a worm wheel on said shaft,
    (d) disks on the respective sides of said block having degree indications thereon rotatable with said shaft,
    (e) a vertical shaft extending through said block,
    (f) a worm on said vertical shaft meshing with said worm wheel,
    (g) a minute indicator on said vertical shaft,
    (h) a second indicator geared to said first named indicator for recording the exact minute,
    (i) means for locking said transverse shaft,
    (j) a knob secured to said vertical shaft for rotating said shaft and disks, and
    (k) a sine bar attachable to one of said disks by a pair of pins and a central screw and provided with a height gauge pin.

3. A combination sine marker and dividing head comprising;
    (a) a block arranged to set on a surface plate in one position for sines and another position for cosines,
    (b) a transverse shaft in said block,
    (c) a worm wheel on said shaft,
    (d) disks on the respective sides of said block having degree indications thereon rotatable with said shaft,
    (e) a vertical shaft extending through said block,
    (f) a worm on said vertical shaft meshing with said worm wheel,
    (g) a minute indicator on said vertical shaft,
    (h) a second indicator geared to said first named indicator for recording the exact minute,
    (i) a knob secured to said vertical shaft for rotating said shaft and disks,
    (j) one of said disks provided with spaced pins, and
    (k) a sine bare secured to said pins by a central screw and provided with a height gauge pin.

4. A combination sine marker and dividing head comprising;
    (a) a block adjustably clamped in position on a standard,
    (b) a transverse shaft in said block,
    (c) a worm wheel on said shaft,
    (d) disks on the respective sides of said block having degree indications thereon rotatable with said shaft,
    (e) a vertical shaft extending through said block,
    (f) a worm on said vertical shaft meshing with said worm wheel,
    (g) a minute indicator on said vertical shaft,
    (h) a second indicator geared to said first named indicator for recording the exact minute,
    (i) a knob secured to said vertical shaft for rotating said shaft and disks,
    (j) a stud threaded into said transverse shaft, and
    (k) bars attached to said stud for supporting a work piece whereby said work piece can be indexed to form divisions on said work piece.

5. A combination sine marker and dividing head comprising;
    (a) a block adjustably clamped in position on a standard,
    (b) a transverse shaft in said block,
    (c) a worm wheel on said shaft,
    (d) disks on the respective sides of said block having degree indications thereon rotatable with said shaft,
    (e) a vertical shaft extending through said block,
    (f) a worm in said vertical shaft meshing with said worm wheel,
    (g) a minute indicator on said vertical shaft,
    (h) a second indicator geared to said first named indicator for recording the exact minute,
    (i) a knob secured to said vertical shaft for rotating said shaft and disks,
    (j) means for locking said transverse shaft,
    (k) a stud threaded into said transverse shaft, and
    (l) bars attached to said stud for supporting a work piece whereby said work piece can be indexed to form divisions on said work piece.

6. A combination sine marker and dividing head comprising;
    (a) a block adjustably clamped in position on a standard,
    (b) a transverse shaft in said block,
    (c) a worm wheel on said shaft,
    (d) disks on the respective sides of said block having degree indications thereon rotatable with said shaft,
    (e) a vertical shaft extending through said block,
    (f) a worm on said vertical shaft meshing with said worm wheel,
    (g) a minute indicator on said vertical shaft,
    (h) a second indicator geared to said first named indicator for recording the exact minute,
    (i) a knob secured to said vertical shaft for rotating said shaft and disks,
    (j) a stud threaded into said transverse shaft, and
    (k) adjustable bars attached to said stud for supporting a work piece whereby said work piece can be indexed to form divisions on said work piece.

References Cited by the Examiner

UNITED STATES PATENTS

| | | | |
|---|---|---|---|
| 1,217,487 | 2/17 | Muller | 33—174 |
| 1,366,396 | 1/21 | Leoffler | 33—174 |
| 2,000,926 | 5/35 | Cox | 33—174 |
| 2,825,970 | 3/58 | Miyamoto | 33—75 |

FOREIGN PATENTS

| | | |
|---|---|---|
| 11,673 | 3/00 | Sweden. |

ISAAC LISANN, *Primary Examiner.*

LEONARD FORMAN, *Examiner.*